April 21, 1964  J. O. MELTON ETAL  3,129,997
WELL DEPTH RECORDER AND ASSOCIATED PEN RETURN
Filed June 20, 1962   10 Sheets-Sheet 1

Fig. 1.

Inventor
James O. Melton,
Irvin M. Carpenter
By William S. Dorman
Attorney

Inventor
James O. Melton,
Irvin M. Carpenter
By William S. Dorman
Attorney

April 21, 1964  J. O. MELTON ETAL  3,129,997
WELL DEPTH RECORDER AND ASSOCIATED PEN RETURN
Filed June 20, 1962  10 Sheets-Sheet 6

Inventor
James O. Melton,
Irvin M. Carpenter
By William S. Dorman
Attorney

3,129,997
WELL DEPTH RECORDER AND ASSOCIATED
PEN RETURN
James O. Melton, Norman, and Irvin M. Carpenter, Oklahoma City, Okla., assignors to The Geolograph Company, Oklahoma City, Okla., a corporation of Oklahoma
Filed June 20, 1962, Ser. No. 203,852
8 Claims. (Cl. 346—33)

This invention relates to an apparatus for visually recording various aspects of drilling operations and, in particular, this invention constitutes an improvement over the type of recorder disclosed in U.S. Patent No. 2,981,-102, issued on April 25, 1961. This application is a continuation-in-part of copending application Serial No. 129,-636, filed August 7, 1961, for Well Depth Recorder.

In general, recording apparatus which has been used in connection with the drilling of oil wells have been of two basic types. In the first type of recorder, a suitable chart is moved continuously at a constant rate of speed; a pen bearing against the chart is deflected intermittently each time that a foot (or given number of feet) is drilled. Thus, the time function is represented along the ordinate and the indications of feet drilled appear as movements in the direction of the abscissa. In this first type of recorder device, the time required for the drilling of a single foot can be determined by measuring the time distance along the ordinate between two successive deflections; similarly, a more general indication of the rate at which the drilling operation is progressing can be determined by the relative spacing between successive deflections in a given series.

The second basic type of recorder is one wherein the chart is moved intermittently in response to the drilling of a single foot or of a given number of feet. The pen is moved continuously across the chart at a constant rate of speed until the given increment of drilling distance is completed. At this point, the pen is returned to its initial reference position, while, at the same time, the chart is advanced one step. In this type of chart, the drilling distance appears along the ordinate and the time is represented along the abscissa. The time required for the drilling of a single foot can be read quite accurately from the chart of this second type of recorder. The progress of the drilling operation can be determined by comparing the lengths of the traces representing successive feet or a series of feet. One advantage of the second type of recorder is that the depth scale can be made the same as that used in electrical and gamma ray logs. This is especially valuable to the geologist who can thus make a direct comparison with electrical or gamma ray logs on the same or on other wells and who may thus make many important and prompt decisions while the well is being drilled.

The first type of recorder, such as is shown in Patents Numbers 2,883,256 and 2,980,486, is actuated by a pulley wheel which is moved in direct response to the movement of the drill string.

The second type of recorder, which is shown in Patent No. 2,981,102, may also be driven by such a pulley wheel.

In some circumstances where it has been proposed to provide both types of recorders, the first recorder is driven by the pulley wheel in the same manner as before, but the second recorder is driven by the first recorder.

In light of the above, it should now be pointed out that the present invention relates to a recorder of the second type which is driven remotely and preferably by a recorder of the first type.

The present invention includes a recorder having three pens providing three different types of information. As will hereinafter appear more clearly in connection with the detailed description of the drawings, the right-hand pen moves across the chart at a constant rate of speed, this pen being driven by a clock-type of device. After the completion of a foot or a given number of feet of drilling, the right-hand pen is returned to its initial reference position while, at the same time, the chart is moved a small increment in a direction at right angles to the movement of this right-hand pen. The center pen is provided to indicate "downtime." Each time that the device is placed in an inoperative condition due, for example, to the interruption of the drilling operation, the center pen produces a slight offset mark from the otherwise vertical trace which it provides on the chart. The left-hand pen is driven by a clock-type device through an eccentric connection such that its trace, during normal drilling operations, is a sine wave. The slope of the sine wave will be indicative of the speed at which drilling is being conducted. When the device is placed in its inoperative condition, the left-hand pen will merely produce a horizontal trace back and forth across the portion of the chart encompassed by the movement of this left-hand pen.

In one form of the present invention, the means for indexing the chart is a pneumatic cylinder which, when energized, advances the drum upon which the chart is mounted a given increment, this increment also being variable; this same pneumatic cylinder operates to disengage the right-hand pen from its drive means so that this pen can be returned to its initial reference position. In the aforementioned copending application, a cable which is wound on a spring biased drum, is connected to the right-hand pen such that, when the drive means for this pen is disengaged, the pen is returned or pulled back to its initial reference position by the cable. Thereafter, when the right-hand pen is re-engaged with its drive means, the spring biased cable is continuously working against the action of the drive means.

In accordance with the present invention, as specifically set forth herein, it was discovered that a more positive drive and return means for the right-hand pen could be accomplished as follows: a second pneumatic cylinder is mounted within the recorder in such a manner that the outer end of the associated piston rod is connected to one end of a second cable, the other end of this second cable being connected to the right-hand pen. The second pneumatic cylinder is energized at the same time as the first pneumatic cylinder in such a manner as to drive the right-hand pen back to its initial reference position whenever the chart drum is indexed. On the other hand, the spring which is mounted internally in the spring biased drum, upon which the first cable is wound, is reversed so that the action of the first cable on the right-hand pen is in the same direction as the prior drive means. Therefore, the prior drive means, which is a clock, permits the spring biasing means (which is now the primary drive means) for the first cable to move the right-hand pen across the chart at a substantially constant rate. In this manner, the right-hand pen is moved in both directions in a more positive manner.

The means for placing the device in its so-called inoperative condition is a third pneumatic cylinder which operates to disengage the right-hand pen from its driving means but which holds this pen in the position it occupied when this third cylinder was actuated. The third pneumatic cylinder also serves to deflect the center pen in a given direction away from its reference position. Preferably, the first and second pneumatic cylinders are actuated by a cam operated pulsing device such as is shown and described in copending application Serial No. 111,778, filed on May 22, 1961, and entitled Cam Operated Pulsing Device. The cam operated pulsing device is preferably mounted so as to be energized by a recorder of the first type such as the recorder shown in Patent No. 2,980,486 as described in application Serial No. 111,778 referred to above. The third penumatic cylinder which is employed in the present invention is preferably operated by a pneumatic valve which is located in the recorder of the type shown in Patent No. 2,980,486, the valve being actuated when the operating handle of the recorder shown in this patent is placed in the Out position.

A second embodiment of the present invention involves a recorder which is essentially electrical. The pneumatic cylinders referred to above are replaced by solenoids and the means for operating these valves are replaced by micro-switches which will actuate the solenoids.

Therefore, it is a principal object of the present invention to provide a recorder of the type described above which can be remotely operated and which preferably can be remotely operated in response to the actuation provided by a recorder of the first mentioned type such as is shown in Patent No. 2,980,486.

A more particular object of the present invention is to provide a specific improvement over the invention disclosed in the copending application referred to above, wherein the drive and return for the righthand pen are replaced by the means referred to above and described herein.

Other and further objects and advantageous features of the present invention will hereinafter more fully appear in connection with a detailed description of the drawings in which.

Figure 1:
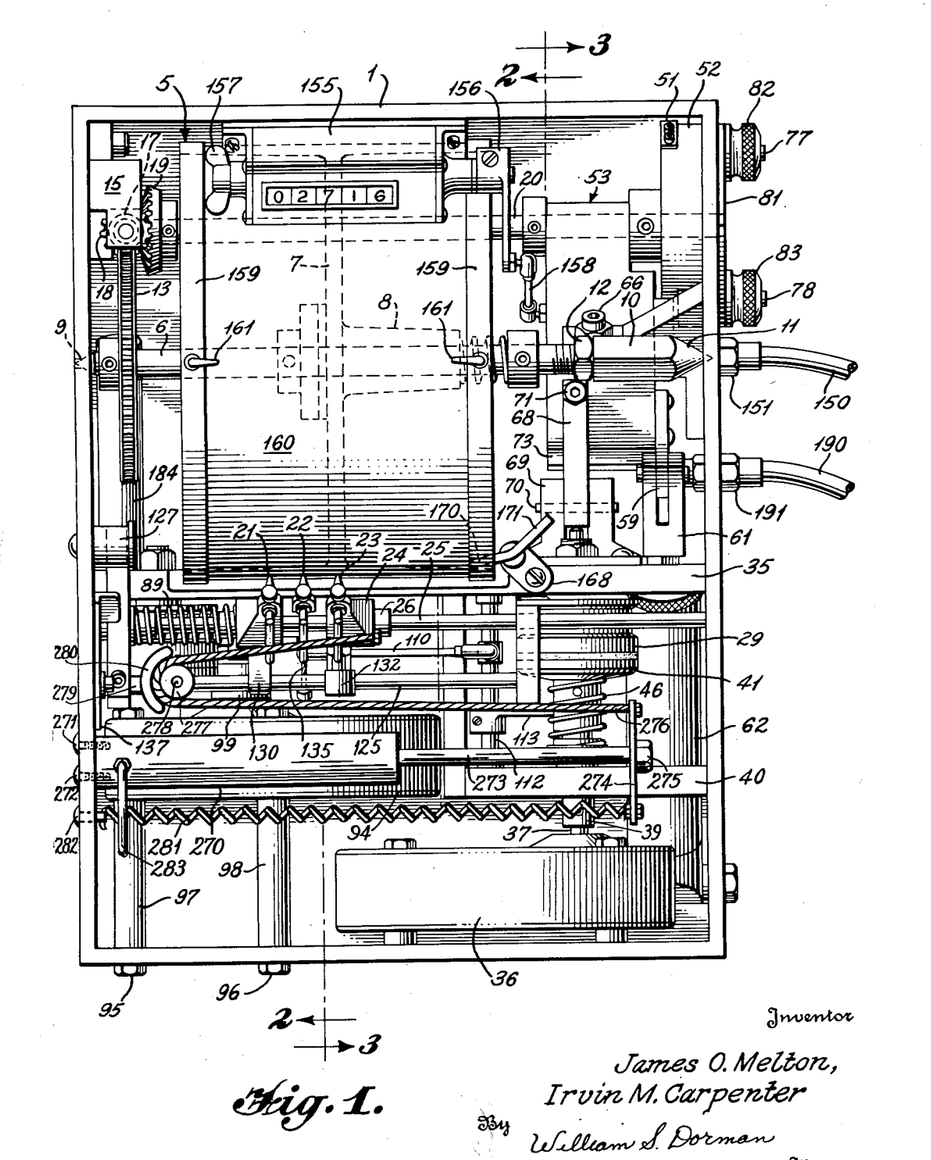
FIGURE 1 is a plan view of the recorder of the present invention with the cover removed.

Referring to the drawings in detail, FIGURES 1 to 6 show a substantially rectangular casing 1 having a top cover 2 which is pivotally connected to the casing by means of a hinge 3. The cover is also provided with a transparent viewing window 4 such that, when the cover is closed, it is possible to observe the chart and the pens, later to be described. Within the casing, a recording drum 5 is mounted on a shaft 6 and fixed thereto for rotation in common. The recording drum 5 is provided with a centrally located supporting partition 7 to which is integrally attached a hub structure 8, the latter being keyed to the shaft 6. Referring particularly to FIGURE 1, the left-hand end of the shaft 6 is suitably pointed as at 9 so as to engage a suitable hole in the casing 1.

At the right-hand end of the shaft 6, there is mounted a pointed head 10 which threadedly engages the right-hand end of the shaft 6 and whose point 11 fits into another suitable hole in the casing 1. The shaft 6 is thus supported against the casing 1 between the pointed ends 9 and 11. A suitable lock nut 12 is provided to hold the pointed head 10 in the proper position. A worm wheel 13 is keyed to the left-hand end of the shaft 6. A vertical shaft 14 is suitably mounted at the rear left-hand side of the casing 1 by means of supports 15 and 16. A worm 17 which is keyed to the upper end of the shaft 14 engages the worm wheel 13 in driving relation. A small bevel gear 18 is keyed to the lower end of the shaft 14. Bevel gear 18 engages a larger bevel gear 19 which is mounted at the left-hand end of horizontal shaft 20. The structure at the right-hand end of the shaft 20 will be described later on.

FIGURE 1 shows three pens identified, from left to right, by reference numerals 21, 22 and 23. The right-hand pen 23 is mounted in a supporting block 24 which is slidable on a horizontal rod 25. The pen 23 is movable from a fixed reference line (representing its left-hand limit of travel) towards the right an amount commensurate with the time required for completing a given increment of drilling distance, as will hereinafter appear.

The pen is movable away from its reference position by means of the multiple cable 27 which passes around cylindrical members 28 and 29. The cable 27 is secured to the block 24 by means of a clamp 30 and to the cylinder 29 by means of a clamp 31. The cable 27 is also secured to the cylinder 28 by means of a clamp (not shown) which is substantially identical to the clamp 31. The cylindrical member 28 is hollow and is mounted for rotation upon the shank of bolt 33 (see FIGURE 5). A clock spring (not shown) is mounted within the cylinder 28 and engages the cylinder 28 and the shank of bolt 33 in such a manner as to continuously urge the cylinder 28 in a clockwise direction so as to tend to urge the pen 23 continuously toward the right.

The cylinder 29 is freely rotatably mounted on a hollow shaft 34 (see FIGURE 7), the latter being journaled at one end in a cross bracket 35 which extends across the frame of the casing 1. The other end of the shaft 34 is suitably journaled in a bracket 40 which is attached to the side of the casing 1. Immediately behind the front plate of the casing 1, there is mounted a clock motor 36 which has an output shaft 37 driven at a constant rate of speed by means of an internal clock mechanism (not shown) of essentially conventional design. Means (not shown) are provided for winding the clock motor 36. The clock shaft 37 is connected to the shaft 34 by means of a pin 39.

An axially movable clutch plate 41 is mounted on the shaft 34. The shaft 34, at a position approximately intermediate its ends, is provided with a slot 42 in which is received a pin 43, the latter engaging, at its ends, the slidable clutch plate 41. Thus, by means of the pin 43 and the slot 42, the clutch plate 41 is keyed for rotation with the shaft 34 but is axially movable relative thereto. A collar 44 is keyed to the shaft 34 by means of a set screw 45. A helical spring engages the collar 44 at its right-hand end and, at its other end, the slidable clutch plate 41 so as to urge the latter towards the left. A flat ring 47 made of cork or similar material is attached to the clutch plate 41 so as to provide gripping engagement between the clutch plate 41 and the cylinder 29. It should be apparent from the above that the clutch plate 41 forms one-half of a clutch and the cylinder 29 forms the other half of the clutch. In the position shown in FIGURE 7, the clutch is therefore engaged. Thus, the clock motor 36 serves to time the rate of movement of the pen 23 towards the right, referring to FIGURE 1, it being already urged in that direction by the spring contained in the cylinder 28. If the clutch is disengaged, in a manner later to be described, and if the pan 23 is returned to its reference position, also in a manner later to be described, the cylinders 28 and 29 will be rotated such that the internal spring structure of the hollow cylinder 28 will be rewound to its initial condition.

Figure 2:
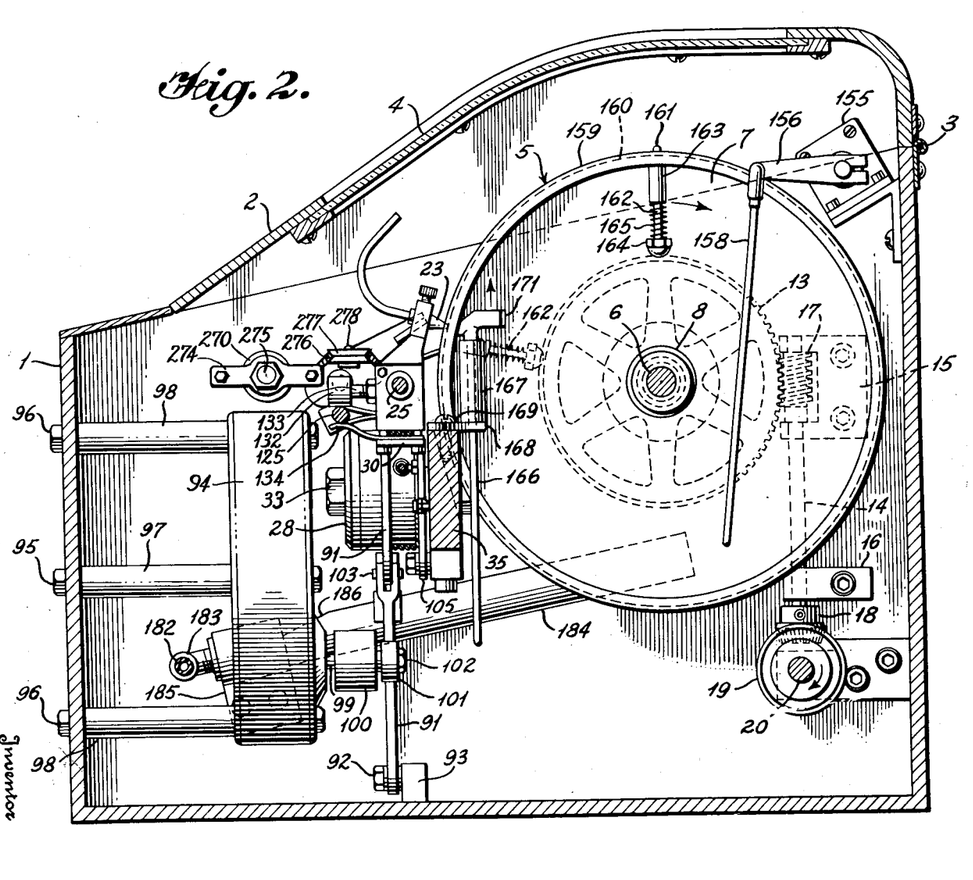
FIGURE 2 is a sectional view taken along section line 2—2 of FIGURE 1.

As best shown in FIGURES 1 and 2, the means for returning the pen 23 to its left-hand position includes an air cylinder 270 attached to the casing 1 by means of screws 271 and 272. A piston (not shown) is slidably mounted within the cylinder 270 and a piston rod 273, which connects with the piston, extends outwardly from the cylinder 270. A narrow plate 274 is secured at its center to the outer end of the piston rod 273 by means of a nut 275. From one side of the plate 274, a cable 276 extends around a pulley 277 to the pen support 24. The pulley is rotatably mounted on a shaft 278 supported from the side of the machine by means of a support 279 which is attached to the casing 1 by any conventional means (not shown). A small cable guard 280 is attached to the support 279 in a position adjacent the pulley 277 to aid in keeping the cable on the pulley. A loading spring 281 extends from the side of the plate 274 opposite from the cable 276 and is attached to the casing 1 by means of a bolt 282. The purpose of the spring 281 is to counterbalance the load from the cable 276 so as to reduce any bending effect on the piston rod 273. A suitable air hose 283 connects with an air hose 154 (later to be described), in a manner not shown. Briefly stated, when a pulse is transmitted through the line to the air hose 283, in a manner later to be described, the air cylinder will be energized such that the piston rod 273 will move outwardly pulling on the cable 276 to return the pen 23 to its initial left-hand reference position.

Figure 3:
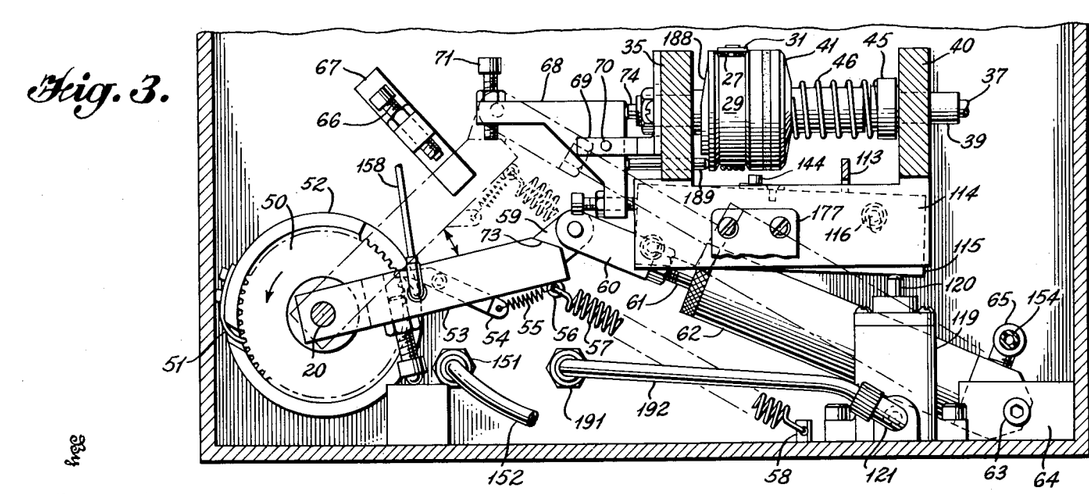
FIGURE 3 is a sectional view taken along section line 3—3 of FIGURE 1.

Referring now to FIGURE 3, a large ratchet wheel 50 is keyed to the right-hand end of the shaft 20. A curved leaf spring 51, mounted on an annular support 52, engages the teeth of the ratchet wheel 50 so as to prevent the latter from turning in a clockwise direction (with respect to FIGURE 3). A rectangular lever 53 is freely rotatably mounted, at one of its ends, on the shaft 20. A pawl 54 is pivotally mounted on the lever 53. A spring 55 is mounted between one end of the pawl 54 and an eye 56, the latter being attached to the lever 53. The spring 55 urges the left-hand tip of the pawl 54 into engagement with the teeth of the ratchet wheel 50. Therefore, when the lever 53 is pivoted in a counterclockwise direction, the ratchet wheel 50 will also be rotated in a counterclockwise direction. Another spring 57 is mounted between the eye 56 and a small bracket 58 which is attached to the base of the casing 1. The spring 57 tends to hold the arm 53 in the solid line position shown in FIGURE 3.

The right-hand end of the lever 53 is provided with an extension 59 which is connected to the outer end 60 of a piston rod 61. The piston rod 61 is connected to a suitable piston (not shown) which is slidably mounted within a cylinder 62. The cylinder 62 is pivotally supported at its lower end by means of a bolt 63 which passes through corresponding holes in the side of the casing, in the lower end of the cylinder 62 and in a bracket 64 which is attached to the base of the casing 1. A source of fluid under pressure is introduced to the right-hand end of the cylinder 62 through the fitting 65 in a manner later to be described. However, when this source of pressure is admitted to the cylinder 62, the piston rod 61 moves outwardly towards the left so as to pivot the lever 53 in a counterclockwise direction thereby rotating the ratchet wheel 50 in a counterclockwise direction. This movement of the ratchet wheel 50 will result in a corresponding movement of the shaft 20. Referring again to FIGURE 2, the movement of the shaft 20 (described with relation to FIGURE 3) will be in the clockwise direction so as to rotate the bevel gear 19 also in a clockwise direction. The arrangement between the bevel gear 18, the shaft 14, the worm 17 and the worm wheel 13 is such that the recording drum 5 will be rotated in a clockwise direction with respect to FIGURE 2.

Figures 7, 8:
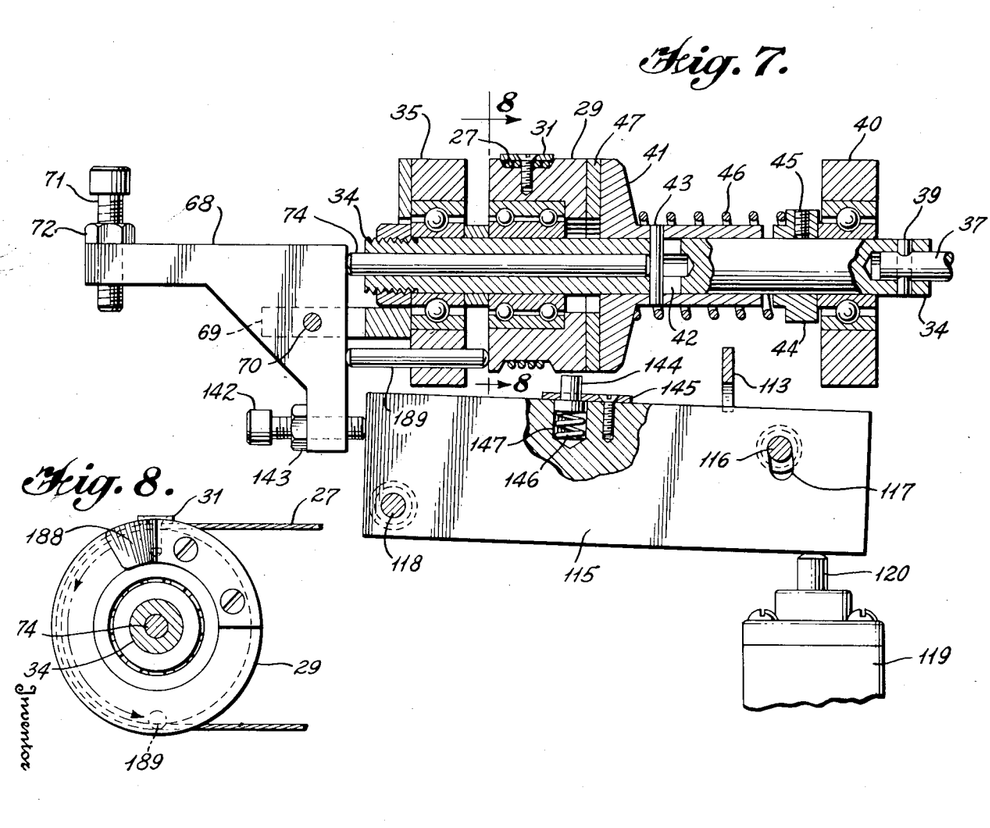
FIGURE 7 is a longitudinal sectional view, on an enlarged scale, of the clutch means for driving the right-hand pen of FIGURE 1.
FIGURE 8 is a rear elevation of a detail of the structure shown in FIGURE 7 as it would appear looking along the viewing line 8—8 of FIGURE 7.

A threaded screw 66 mounted in a suitable bracket 67, the latter being attached to the side of the casing 1, provides a suitable stop for limiting the upward movement of the lever 53. A bell crank 68 is pivotally mounted on the bifurcated support 69 by means of a pin 70. The support 69 is secured to the cross bracket 35. A bolt 71 is threadedly mounted in the outer left-hand end of the bell crank 68 and is provided with a lock nut 72. The outer right-hand end of the lever 53 is provided with a flat portion 73 which engages the lower end of the bolt 71 when the lever 53 is moved to its upper (or dotted line) position as shown in FIGURE 3. Referring particularly to FIGURE 7, an elongated pin 74 is slidably mounted with the hollow bore of the shaft 34. The right-hand end of the pin 74 engages the transverse pin 43 which is attached to the clutch plate 41. The left-hand end of the pin 74 engages the bell crank 68 as shown in FIGURE 7. Therefore, when the lever 53 is moved to the dotted line position shown in FIGURE 3 for the purpose of rotating the recording drum 5, as previously described, the bell crank 68 will be moved simultaneously so as to move the pin 74 and, hence, the clutch plate 41 towards the right. This action will release the clutch. As will hereinafter appear, the source of air pressure which is introduced into the cylinder 62 is simultaneously introduced into the cylinder 270 through the conduit 283, such that the piston rods 61 and 273 are actuated simultaneously. Therefore, since the clutch has been released, the pen 23 will be readily moved back to its initial left-hand reference position by the cable 276 under the action of the piston rod 273. Thus, every time that the drum 5 is indexed, the pen 23 will be returned to its reference position.

Figure 9:
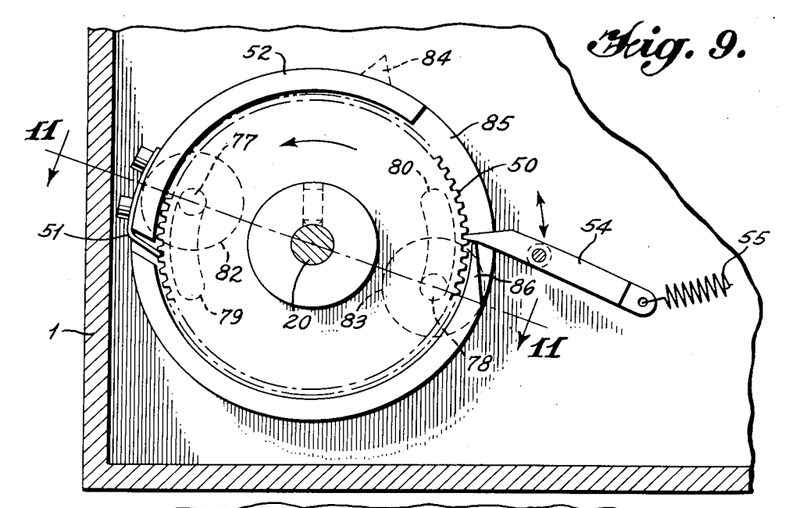
FIGURE 9 is a fragmentary left-hand elevation, with some parts in section, of the mechanism employed for varying the indexing of the chart drum.
Figure 10:
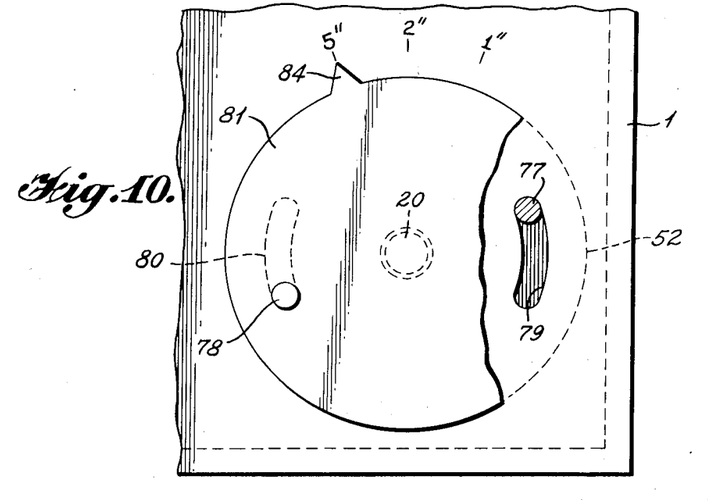
FIGURE 10 is a fragmentary right-hand elevation taken from a position directly opposite from FIGURE 9 on the outside of the apparatus.
Figure 11:
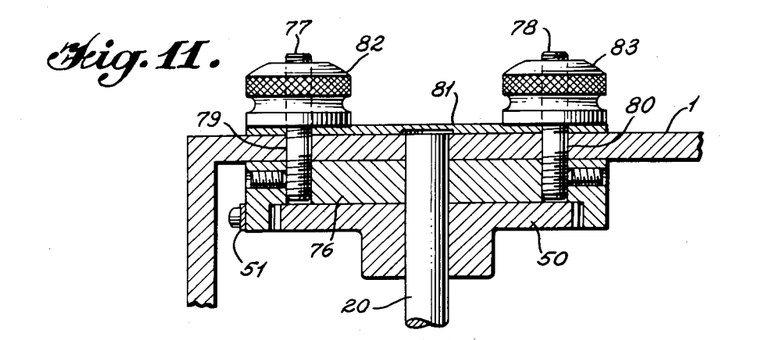
FIGURE 11 is a sectional view taken along section line 11—11 of FIGURE 9.

Referring now to FIGURES 9 to 11, the annular support 52, in which the spring 51 is mounted, is integral with a flat circular base 76. Two threaded bolts 77 and 78 are threadedly received in suitable holes in the flat circular member 76 and project outwardly from the casing 1 through arcuate slots 79 and 80, respectively. The bolts 77 and 78 also pass through suitable holes in a disc 81. A pair of knurled nuts 82 and 83 are mounted on the ends of the bolts 77 and 78, respectively. The disc 81 is provided with a pointer 84 which can be moved to the three different positions corresponding to five inches, two inches and one inch as shown in FIGURE 10, these dimensions representing the number of inches on the chart for every one hundred feet of drilling. The annular support 52 is provided with an opening 85 through which the pawl 54 projects to engage the teeth of the ratchet wheel 50. A bevelled edge 86 is located at the lower end of the opening 85. Movement of the disc 81 from the position shown in FIGURE 10 to either of the other two positions shown in this figure will raise the position of the bevelled edge 86 such that the pawl 54 will engage the teeth of the ratchet wheel 50, at a later time during its course of upward travel with the lever 53. Thus, the position shown in FIGURE 9 represents the maximum amount of movement which can be imparted to the ratchet wheel 50 by the pawl 54. If the disc 81 is moved to its extreme clockwise position (referring to FIGURE 10) this will represent the minimum degree of movement which can be imparted to the ratchet wheel 50 by the pawl 54. The knurled nuts 82 and 83 can be used to lock the annular support 52 and the disc 81 in any given position.

The left-hand pen 21 is mounted on a block 88 which is slidable on the rod 25. A spring 89, surrounding the rod 25, is mounted between a collar 90 and the block 88 so as to urge the latter continuously toward the right. The right-hand end of the block 88 bears against the upper end of a lever 91 which is pivotally mounted at its lower end by means of a bolt 92 and a block 93 which is attached to the base of the casing 1.

A second clock motor 94, similar in all essential respects to the clock motor 36, is supported from the front of the casing wall 1 by means of bolts 95 and 96 and sleeves 97 and 98. The clock motor 94 has an output shaft 99 which is rotated at a constant rate of speed by means of the internal mechanism (not shown) of the clock motor. A small cylinder 100 is keyed to the end of the shaft 99. A small roller 101 is electrically mounted on the cylinder 100 by means of a bolt 102. The roller 101 bears against the right-hand end edge of the lever 91 as it appears in FIGURE 5. As the shaft 99 and the cylinder 100 rotate continuously, the roller 101 will move in a circular path causing the lever 91 to move back and forth such that the pen 21 will move back and forth in a horizontal direction. If a suitable chart is mounted on the drum 5, and if the drum 5 rotates continuously (although step-wise), the trace that is described by the pen 21 on this chart will be a sine wave whose slope will be indicative of the rate of drilling, as will hereinafter appear in connection with a description of FIGURE 12. A pivotal connection 103 and a threaded bolt 104 are provided intermediate the ends of the lever 91 to permit an adjustment of the position of the upper end of lever 91.

The central pen 22 is mounted at the upper end of a lever 105 which is pivotally mounted at its lower end by means of bolt 106 and a support 107, the latter being attached to the cross bracket 35. A spring 108 engages a suitable hole in the lever 105 and a pin 109 in the cross bracket 35 so as to urge the lever 105 in a clockwise direction as it appears in FIGURE 5. A link 110 is pivotally connected at one end to the lever 105 and, at its other end, to the upper end of a small lever 111, the latter being keyed to a shaft 112. An arm 113 is also keyed at one end to the shaft 112, this arm passing over the top of a fixed supporting plate 114 and resting against the top of a pivotal pin 115. A bolt 116 is threadedly received in the fixed supporting plate 114 passing through a suitable slot 117 in the pivotal plate 115. Another bolt 118 serves to mount the plate 115 pivotally with respect to the fixed supporting plate 114.

A pneumatic cylinder 119 is mounted on the base of the casing 1 in a position below the pivotal plate 115. A plunger 120 projects upwardly out of the cylinder 119 and bears against the lower edge of the pivotal plate 115. A suitable piston (not shown) is mounted at the lower end of the plunger 120 such that the cylinder 119 and the piston operate in a substantially conventional manner. Fluid under pressure can be introduced to the cylinder 119 through a fitting 121, in a manner later to be described, such that, when there is pressure within the cylinder 119, the plunger 120 will be elevated so as to pivot the plate 115 about the bolt 118. This movement of the plate 115 will cause the arm 113 to move in a counterclockwise direction (as it appears in FIGURE 5) resulting in a movement of the link 110 towards the left so as to cause a corresponding deflection of the pen 22 towards the left.

The collar 90 is provided with an extension in the form of an arm 123. Another arm 124 is pivotally mounted at one end on the rod 25. Another rod 125 connects between the outer ends of the arms 123 and 124 in parallel relation with the rod 25. A leaf spring 126 is connected to the upper surface of the arm 123 and bears against the lower surface of an adjustable cam 127, the latter being attached to the casing 1 by means of the threaded screw 128. The leaf spring 126 normally urges the arm 123 in a clockwise direction with respect to the rod 25, as these members appear in FIGURE 6. The cam 127 can be adjusted by means of the screw 128 to vary the pressure of the leaf spring 126.

The pen block 88 is provided with leaf springs 130 and 131 which engage the upper and lower surfaces, respectively, of the rod 125. The pen block 24 is provided with a roller 132 which rides along the upper surface of the rod 125. This roller is mounted on a stub shaft 133 which is attached to the block 24. A leaf spring 134 is held against the underside of the block 24 by means of the clamp 30. This leaf spring 134 bears against the lower surface of the rod 125. A cable 135 is attached to the upper end of the lever 105. The lower end of the cable 135 passes through a suitable hole in the rod 125 and a round nut 136 is secured to the outer end of the cable.

A pen-releasing lever 137 is pivotally attached to the side wall of the casing 1 by means of the bolt 138. The lever 137 is provided with a handle portion 139 and a curved portion 140 which engages the outer end of the rod 125. When the lever 137 is moved to the dotted line position shown in FIGURE 6, the arm 123 and the rod 125 are moved downwardly to the dotted line position shown in FIGURE 6. This downward movement of the rod will be transmitted to the leaf springs 131 and 134 causing the blocks 88 and 24, respectively, to pivot relative to the rod 25 thereby moving the pins 21 and 23, respectively, away from the drum 5. Similarly, this downward movement of the rod 125 will exert a pull on cable 135 so as to move the pen 22 away from the drum 5. Thus, if a chart were mounted on the drum 5, the pens would be out of contact with the chart when the lever is in dotted line position shown on FIGURE 6.

Figure 6:
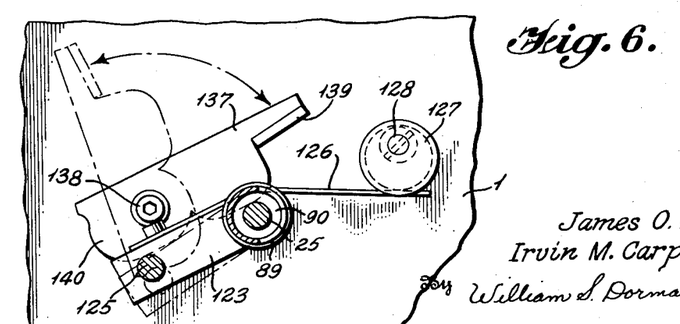
FIGURE 6 is a fragmentary detail of the means for lifting the pen away from the chart.

When the pen-releasing lever 137 is returned to the solid line position shown in FIGURE 6, the leaf spring 130 on the block 88 will return the pen 21 to its initial position of contact against the drum 5, and the roller 132 will similarly cause the return of the pen 23 to its position of contact against the drum 5. Releasing the pull on the cable 135 will permit the pen 22 to return to its position of contact against the drum 5.

When the pivotal block 115 is moved upwardly by the plunger 120 in FIGURE 7, the upper left-hand corner of the pivotal block will engage a threaded bolt 142 which is threadedly received in a suitable hole in the bell crank 68 and which is held in position by means of the lock nut 143. Therefore, the upward movement of the pivotal block 115 will cause the bell crank 68 to pivot in a relatively clockwise direction around the pin 70 so as to urge the pin 74 towards the right, disengaging the clutch plate 41 from the cylinder 29. At the same time, a resilient bumper 144 engages the periphery of the cylinder 29 so as to prevent the same from being rotated. Therefore, the pen 23 will remain in whatever position it occupied at the time the clutch was so disengaged. The bumper 144 is held against the upper edge of the pivotal plate 115 by means of the flat retaining member 145. A suitable spring 146 mounted in a hole 147 beneath the bumper 144 urges the latter outwardly and insures good contact between the bumper 144 and the periphery of the cylinder 29.

An external hose 150 (see now FIGURE 1) is attached to an input coupling 151 and connects with a device such as the cam operated pulsing device disclosed in copending application Serial No. 111,778, filed May 22, 1961, or any other system which is adapted to produce a pneumatic pulse for a given increment of drilling distance. An internal hose 152 is connected to the coupling 151 and also to the T 153 (see FIGURE 4). The T 153 connects with a hose 154, the latter connecting with the fitting 65 on the pneumatic cylinder 62. Thus, as an input pulse comes in from an external source through the hose 150, the pulse will be transferred through the hoses 152 and 154 to the pneumatic cylinder 62 so as to index the drum 5 and to return the pen 23 to its initial reference position as described above. As indicated heretofore, the air hose 283 is connected to the air hose 154, in a manner not shown. Therefore, the input pulse is transmitted not only to the pneumatic cylinder 62, but to the pneumatic cylinder 270 as well, to provide the action described above.

The recorder of the present invention is also provided with a counter 155 having an operating arm 156 and a reset handle 157. A link 158 connects between the outer end of the arm 156 and a point intermediate the ends of the lever 53. Thus, each time that the pneumatic cylinder 62 is actuated, the counter 155 will be advanced in an amount commensurate with the increment of drilling distance.

Figure 12:
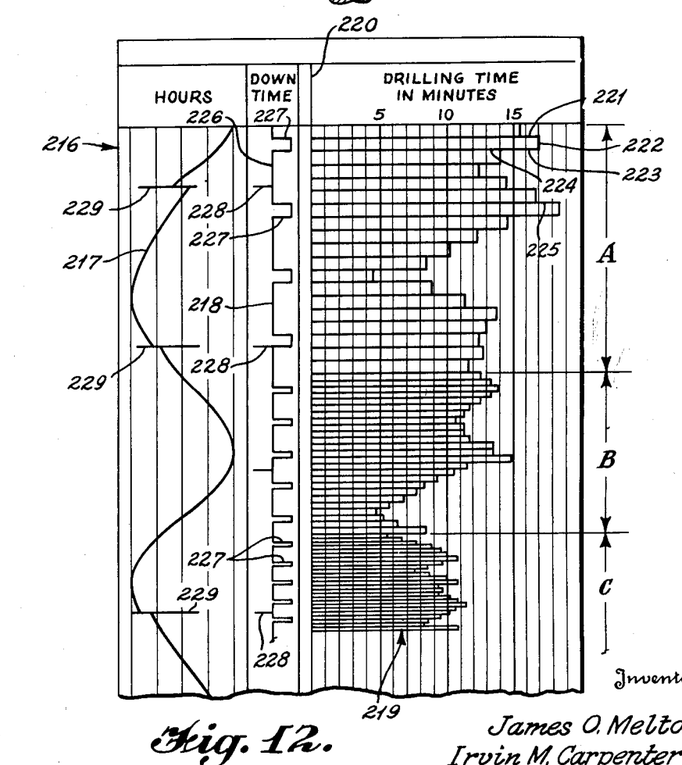
FIGURE 12 is a semi-diagrammatic view representing a portion of a chart produced from the operation of the apparatus of the present invention.

The drum 5 is provided with a pair of marginal flanges 159 slightly raised from the surface 160. A recording chart, later to be described in connection with FIGURE 12, is wrapped in the form of a strip of paper around the surface 160 between the flanges 159 and is held in position by clips 161. Each clip 161 is composed of a rod 162 passing through a sleeve 163 attached to the undersurface of the flange 159. The lower end of the rod 162 is provided with an enlarged head 164. A spring 165 is received on the rod 162 bearing against the head 164 and the lower end of the sleeve 163 so as to press the clip 161 downwardly into contact with the surface 160 of the drum 5.

Adjacent to the drum 5, a rod 166 is slidably mounted in a sleeve 167, the latter being attached to the cross bracket 35 by means of a small metal strip 168 and the screw 169. At the upper end of the rod 166 there is attached a finger 170 which projects into the interior of the drum 5 behind the flange 159. The finger is provided with a tab 171 for the purpose of turning the finger as will hereinafter appear. The lower end of the rod 166 (see FIGURE 4) is connected to a collar 173. The upper surface of this collar 173 bears against the lower surface of an arm 174 which is pivotally mounted by means of a bolt 175 to a valve 176. The valve, which is suitably supported from the plate 115 by means of bracket 177, is provided with an inlet fitting 178 and an outlet fitting 179 which connects with the inlet and outlet ports (not shown), respectively, of the valve 176. This valve is also provided with a plunger 180 which, when the rod 166 is pulled upwardly, is actuated to place the inlet and outlet ports of the valve in communication with one another. The inlet to the valve 176 is placed in communication with the hose 152 by means of the short hose 181 which is connected between the fitting 175 and the T 153.

A hose 182 (see FIGURE 5) connects from the fitting 179 to a fitting 183 mounted at the lower end of a whistle 184 (see FIGURE 2). The whistle 184 is suitably mounted from the side of the casing 1 by means of the support 185. The whistle is provided with a slanted opening 186 adjacent its lower, or inner, end such that the whistle, considered in light of its length and shape, is capable of producing an audible signal when air is passed through the whistle.

If the drum rotates in a clockwise direction with respect to FIGURE 2, the clips 161 and associated structure will move from the solid line position shown in FIGURE 2 until, eventually the sleeve 163 will contact the inner projecting portion of the finger 170. Continued movement of the drum 5 beyond this point will cause the rod 166 to be lifted upwardly such that the arm 174 will contact the plunger 180 and open the valve 176. Thus, whenever an input pneumatic pulse passes thereafter into the hose 152 the air will be conducted through the hose 181, through the valve 176, and eventually to the whistle 184 thereby producing an audible sound. This audible signal will indicate to the operator that the chart which is mounted on the drum 5 should be changed.

At the lower end of the rod 166, a spring 187 is interconnected between the collar 173 and the supporting structure for the valve 176. This spring will hold the finger 170 in the position shown in FIGURE 1. However, if the drum 5 moves such that the clip 161 comes to the dotted line position shown in FIGURE 2, it will be necessary to move the finger 170 out of the way so that the drum will be capable of moving thereafter. Thus, the tab 171 is turned in a clockwise direction relative to FIGURE 1 so that the sleeve 163 can pass by the finger 170.

In order to prevent overtravel of the pen 23 toward the right, the supporting block 24 is provided with a collar 26 (which can be integral or otherwise) which is adapted to engage the arm 124 to stop further movement of the pen 23 under the action of the cable 27. If it is desired to stop the pen 23 at an earlier point, a collar (not shown) can be secured to the rod 25 to the left of the arm 124. If it is desired to disconnect the clock motor 36 from driving engagement with the cylinder 29, the latter can be provided with a cam 188 on its rear surface (see FIGURE 3). A pin 189 is slidably mounted in the cross bracket 35 such that the left-hand end of this pin 189 bears against the bell crank 68 below its pivotal support 70. The position of the cam 188 relative to the rear surface of the cylinder 29 is such that, as the cylinder 29 rotates to move the pen 23 towards the extreme right-hand position of movement of the pen, the cam 188 will contact the right-hand end of the pin 189 so as to move the latter towards the left, thereby causing the bell crank 68 to pivot in a clockwise direction with respect to the pin 70 as it appears in FIGURE 7. This movement of the bell crank 68 will cause the pin 74 to be moved towards the right tending to disengage the clutch plate 41 from the cylinder 29. If the disengagement of the clock motor is not desired in this manner, then the cam 188 or the pin 189, or both, can be removed.

An external hose 190 connects at one end with the fitting 191 which passes through the side of casing 1. The other end of the hose 190 connects with a suitable source of pressure which will preferably be supplied continuously during the period of time that the actual drilling operation is interrupted. Preferably this source of pressure will include a valve (not shown) which is mounted within a recorder of the type disclosed in U.S. Patent No. 2,980,486. Such a valve should connect with a source of pressure and should be actuated whenever the clutch handle in the aforementioned patent is thrown to the Out position so as, thereafter, to provide a continuous source of pressure to the hose 190.

Within the casing 1 a hose 192 connects between the fitting 191 and the fitting 121 on the pneumatic cylinder 119. Therefore, when the recorder of the type shown in Patent No. 2,980,486 is placed in the inoperative, or Out, position, the valve (not shown) which would be located within the structure of the aforementioned patent, would supply a continuous source of pressure through the hose 192 to the pneumatic cylinder 119 so as to pivot the plate 115 to its uppermost position, causing the pen 22 to be deflected towards the left while at the same time disengaging the clutch for the pen 23 and holding this pen 23 in the position which it occupied at the time the clutch was disengaged.

Figure 13:
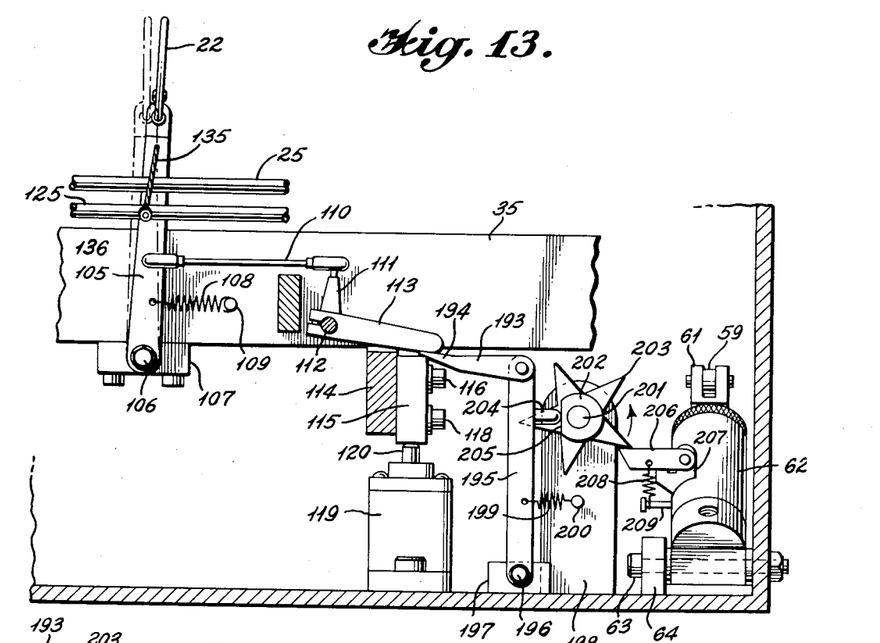
FIGURE 13 is a fragmentary front elevation, with certain parts in section, showing a modification of the present invention hereinafter described as a five-foot marker.
Figure 14:
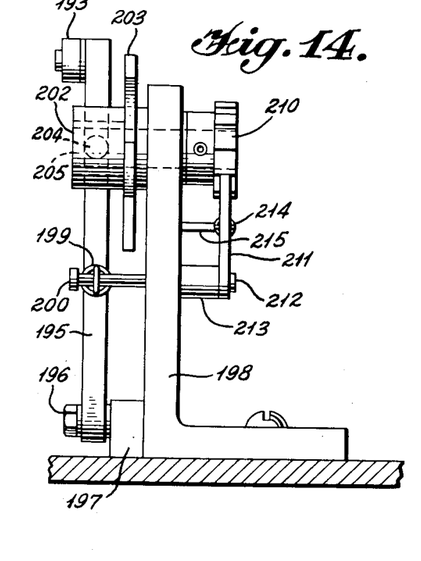
FIGURE 14 is a right-hand elevation, on an enlarged scale, of a portion of the modification shown in FIGURE 13.
Figure 15:
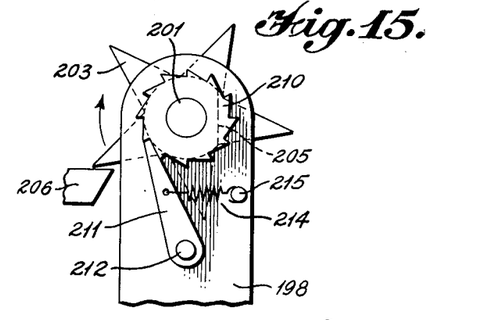
FIGURE 15 is a fragmentary rear elevation, on an enlarged scale, of a portion of the modification shown in FIGURE 13.

FIGURES 13, 14 and 15 represent a modification of the present invention wherein structural means are provided to cause a deflection of the pen 22 for each fifth foot, or fifth increment, of drilling distance. The structure will now be described, but the purpose will appear hereinafter in connection with a detailed description of FIGURE 12. Briefly stated, the structure of FIGURES 13, 14 and 15 involves the employment of a movable finger 193 having a wedge-shaped tip 194; the wedge-shaped tip of this finger is inserted between the end of the arm 113 and the pivotal plate 115, which, as previously described, constitutes the immediate means for moving the arm 113. During four out of every five feet that are recorded by the apparatus of the present invention, the finger 193 will be in such a position that the pen arm 105 will occupy the dotted line position shown in FIGURE 13. During the fifth foot, the finger 193 will be in the position shown in FIGURE 13 and the pen arm 105 will be in the solid line position shown in this figure.

The finger 193 is pivotally mounted on the upper end of an arm 195, the latter being pivotally connected to the casing 1 by means of a bolt 196 and a support 197 which is attached to the base of the casing 1. A vertical standard 198 is mounted to the right, and to the rear, of the support 197. A spring 199 is connected at one end to a suitable hole in the arm 195 and at its other end to a pin 200 which is secured to the standard 198.

A shaft 201 is suitably journaled for rotation in the upper end of the standard 198. A collar 202 and a star wheel 203 are keyed to one end of the shaft 201 for rotation therewith. The arm 195 is provided with a horizontally projecting bumper 204 which is urged against the surface of the collar 202 under the action of the spring 199. The collar 202 is provided with a flat surface 205 such that, in the position shown in FIGURE 13 representing the fifth increment of drilling distance, the arm 195 and the arm 105 are at their right-hand limit of movement.

A pawl 206 is pivotally mounted on a support 207 which is attached to the pneumatic cylinder 62. A spring 208 is connected between a suitable hole in the pawl 206 and a pin 209 which is attached to the cylinder 62. The spring 208 holds the pawl 206 against the support 207 in the position shown in FIGURE 13. The location of the pawl 206 relative to the star wheel 203 is such that, as the cylinder 62 is actuated in response to a pneumatic pulse coming in through the fitting 65, the cylinder 62 will be elevated and the pawl 206 will contact one of the points of the star wheel 203 so as to turn the same through approximately one-fifth of a revolution. The star wheel 203 moves in a counterclockwise direction with respect to FIGURE 13 and in a clockwise direction with respect to FIGURE 15.

Means are provided to prevent rotation of the star wheel in the opposite direction. A ratchet wheel 210 is keyed to the other end of the shaft 201. A pawl 211 is pivotally mounted on the standard 198 by means of the pin 212 and the sleeve 213. A spring 214 is connected between a hole in the pawl 211 and a pin 215 which is secured to the standard 198. The spring 214, therefore, urges the upper end of the pawl 211 into engagement with the ratchet wheel 210 thus preventing, with respect to FIGURE 15, movement of the star wheel 203 in a counterclockwise direction. When the pneumatic cylinder 62 moves from its upper position to its lower position, the pawl 206 will pivot in a clockwise direction against the action of the spring 208 so that the pawl can move past the star wheel 203 and return to the condition shown in FIGURE 13.

Referring now to FIGURE 12, this figure represents a portion of a chart which would be produced by the structure described in FIGURES 1 to 15, inclusive. The chart, generally designated by the reference numeral 216, shows a left-hand trace 217, a central trace 218 and a right-hand trace 219 produced by the pens 21, 22 and 23, respectively. Purely for the purpose of illustration, the chart is subdivided into three portions labeled A, B and C which represent three different positions of the pointer 84 shown in FIGURE 10. Thus, the portion corresponding to the reference letter A represents a movement of the pens when the pointer 84 is in the 5" position, such that the chart is adapted to record 100' of drilling for every 5" of the chart. Similarly, the portion of the chart corresponding to the reference letter B represents the condition where the pointer 84 is located beneath the 2" position such that the chart will be recording 100' of drilling for every 2" of the chart. Finally, the portion of the chart corresponding to the reference letter C represents the condition where the pointer 84 is beneath the 1" position such that the chart is recording 100' of drilling for every inch of the chart.

The right-hand trace 219 representing the movement of the pen 23 is made with respect to a left-hand reference line 220. The horizontal line 221 from the reference line 220 to the short vertical line 222 corresponds to the movement of the pen 23 from the reference line for a period of time approximating 17 minutes. This indicates that the particular foot being drilled has taken 17 minutes. At the end of this period of time a pneumatic pulse passes into the apparatus through the hose 150 and through the cylinder 62 from an actuating means, as previously described, which operates in response to the movement of the drilling string. As indicated heretofore, this pulse will index the drum 5 thereby causing the short vertical line 222; at the same time this pulse will release the clutch and actuate the cylinder 270 causing the pen 23 to return to its initial reference position, as represented by the horizontal return line 223. At this point, the pen 23 will again begin to move across the chart towards the right making the horizontal line 224 which is superimposed on the return line 223. As shown in FIGURE 12, the reference line 224 continues for approximately 14 minutes at which time the next foot of drilling has been completed. Therefore, the short vertical line at this point indicates the indexing of the chart and the horizontal line immediately below the line 224 represents the return of the pen 23 to the reference line 220.

The horizontal line 221 represents the beginning of a fifth foot being drilled; so also does the reference line 225. By the time that the pen 23 is beginning to make the traces corresponding to the lines 221 and 225, the flat 205 on the collar 202 will be in the position shown in FIGURE 13 such that the pen 22 will be in its extreme right-hand position as shown in this figure. Thus, the pen 22 will move from its reference position represented by the reference numeral 226 and will describe a series of rectangular traces 227 corresponding to each fifth foot of drilling. However, whenever the drilling ceases, at which time pressure is supplied from a source indicated heretofore through the hose 190, the cylinder 119 will be energized so as to lift the pivotal plate 115 upwardly thereby deflecting the pen 22 towards the left and producing the horizontal deflections 228 on the central trace 218. When the drilling begins again, the source of pressure is removed from the hose 190 and the pen 22 returns to the reference line 226.

The left-hand trace 217 is made by the pen 21 moving back and forth while the chart and the drum 5 are moved intermittently in response to the progress of the drilling operation. The trace 217 is generally in the form of a sine wave whose slope will be commensurate with the rate of drilling. However, whenever the drilling operation ceases such that no further pulses come in through the hose 150, the drum 5 will remain in a stationary condition and the pen 21 will describe a series of horizontal lines 229.

Figure 16:
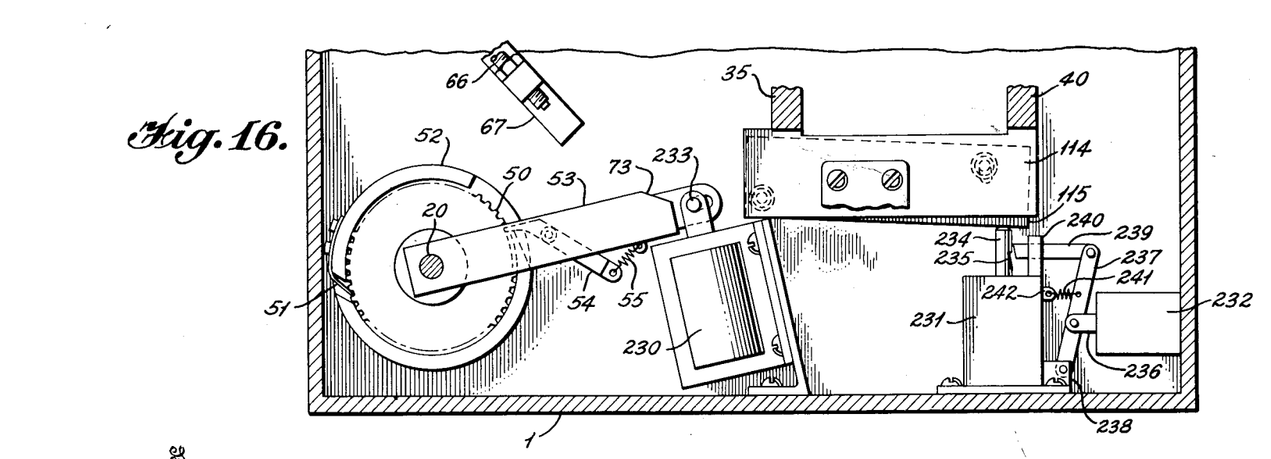
FIGURE 16 is a view similar to FIGURE 3, with certain parts being omitted for the sake of simplicity, showing a modification of the present invention wherein the pneumatic means are replaced by electrical means.

FIGURE 16 is a diagrammatic representation of a modification of the present invention wherein electrical means have been substituted for the pneumatic means previously described. Comparing FIGURE 3 with FIGURE 16, it will be noted that a solenoid 230 hereinafter referred to as the "footage solenoid" has been substituted for the pneumatic cylinder 62. Similarly, a solenoid 231, hereinafter referred to as the "out-of-gear solenoid" has been substituted for the pneumatic cylinder 119. In order to supplement the action of the solenoid 231 it has been necessary to provide a further solenoid 232, hereinafter referred to as the "unlatching solenoid." An additional solenoid 268 (not shown in FIGURE 16 but shown diagrammatically in FIGURE 18) is provided to replace the pneumatic cylinder 270.

The solenoid 230 is provided with an armature 233 which engages the arm 53 and which operates in substantially the same manner as the piston rod 61 previously described. The solenoid 231 is provided with an armature 234 which corresponds with the plunger 120 and which is movable upwardly so as to pivot the plate 115 upwardly. The armature 234 is provided with a notch 235, the purpose of which will hereinafter appear.

The solenoid 232 is provided with an armature 236 which engages a lever 237, the latter being pivotally mounted at its lower end on a support 238. A horizontal latching member 239 is slidably mounted in a support 240 attached to the upper portion of the solenoid 231. The right-hand end of the slidable latch 239 is pivotally attached to the upper end of the lever 237. A spring 241 is connected between a suitable hole in the lever 237 and a tab 242 on the solenoid 231 so as to urge the lever 237 and the slidable latch 239 toward the left as it appears in FIGURE 16. The mounting of the lever 237 and the spring 241 is such that, whenever the armature 234 of the solenoid 231 is lifted due to the energization of the solenoid 231, the latch 237 will be moved to the right and will enter the slot 235 on the armature 234, thereby preventing the armature 234 from returning to the position shown in this figure even when the solenoid 231 is later deenergized. As will hereinafter appear, it is necessary to energize the unlatching solenoid 232 in order to release the armature 234 so as to permit it to return to the position shown in this figure.

Figure 4:
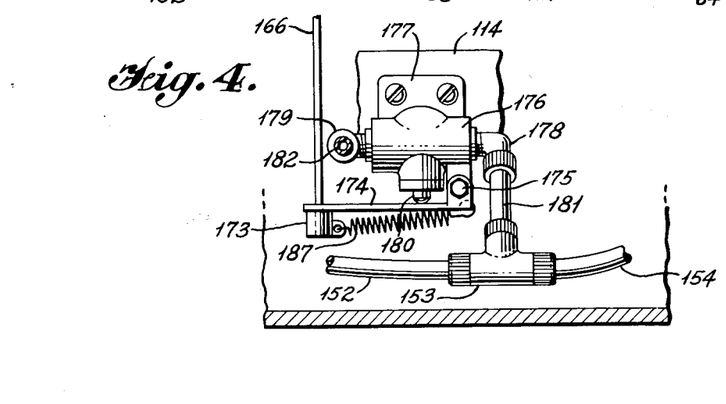
FIGURE 4 is a fragmentary elevation showing pneumatic means for actuating an audible alarm.
Figure 5:
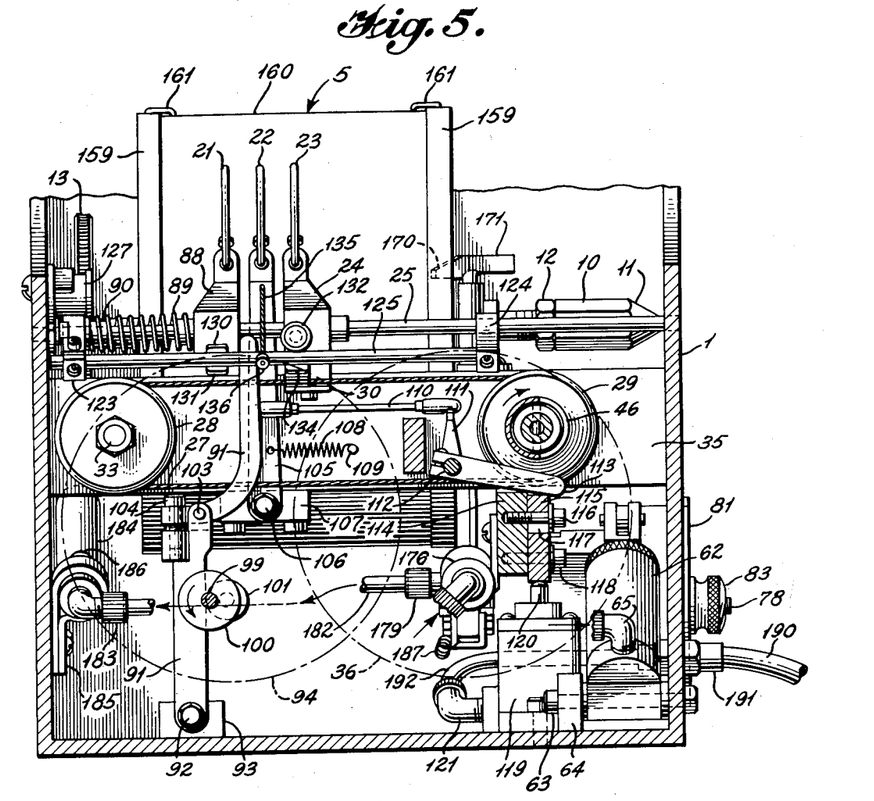
FIGURE 5 is a transverse sectional view looking towards the rear of the apparatus from a location adjacent the front of the apparatus with certain parts in section and with certain parts omitted for the sake of clarity of presentation.
Figure 17:
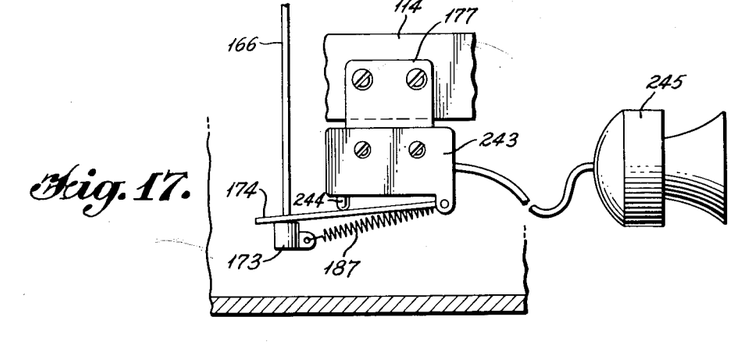
FIGURE 17 is a fragmentary elevation showing an electrical means for actuating an audible alarm.

FIGURE 17 shows, as compared with FIGURE 4, that the valve 176 has been replaced by a microswitch 243, the operating element 244 corresponding with the plunger 180. Whenever the rod 166 is elevated by the turning of the drum 5 in the manner described above, the switch 243 will be closed so as to operate a horn 245, the latter constituting a substitute for the whistle 184.

Figure 18:
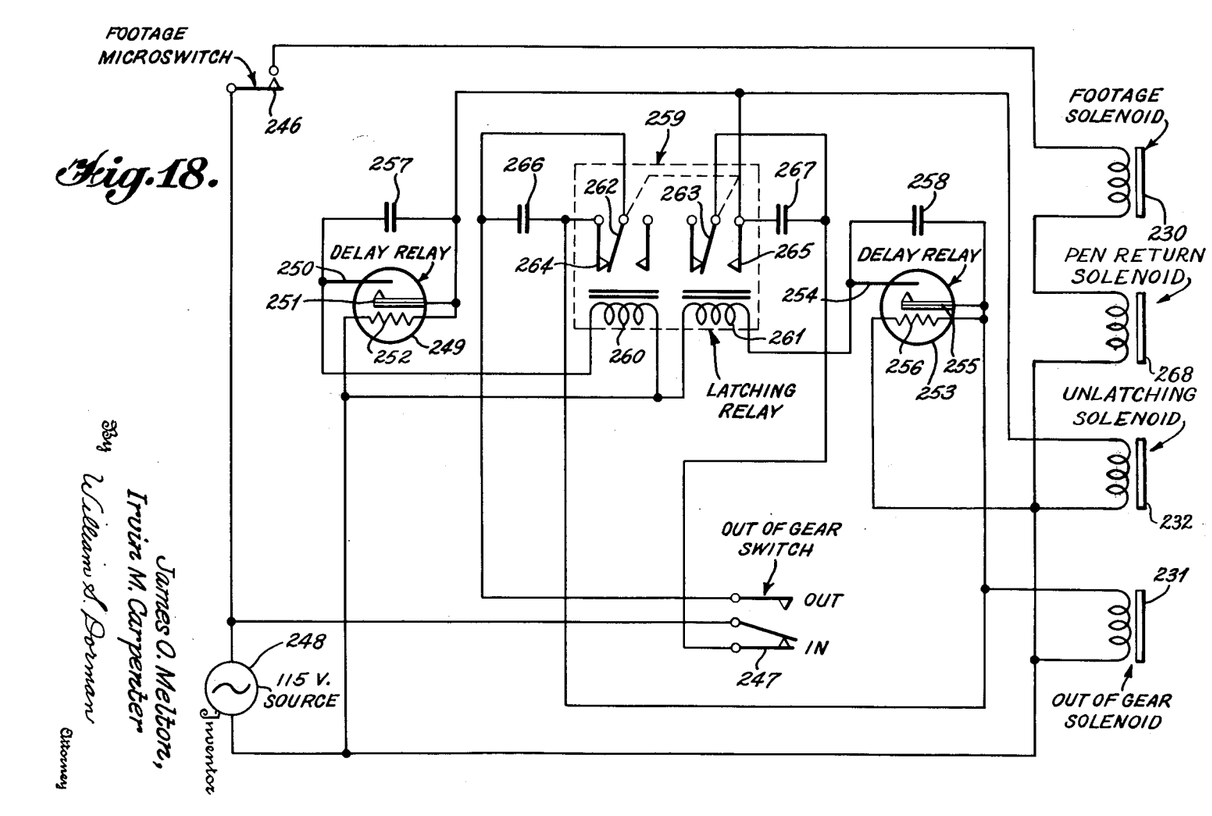
FIGURE 18 is an electrical circuit diagram showing the electrical components employed for operating the structure shown in FIGURE 16 plus the pen return solenoid.

In FIGURE 18 there is shown a microswitch 246 designated as a "footage microswitch." This microswitch 246 will be closed by means (not shown) operating in response to the progress of the drilling operation and preferably will be mounted in a device such as is shown in U.S. Patent No. 2,980,486; therefore, the footage microswitch is preferably closed each time that a foot of drilling has been completed. Another switch, designated by the reference numeral 247 and hereinafter referred to as the "out-of-gear switch" is movable into two positions designated as "in" and "out" corresponding to the times when the drilling operation is progressing and when the drilling operation has been interrupted, respectively. Preferably, this out-of-gear switch will be installed in an apparatus of the type shown in Patent No. 2,980,486 and will be moved to the "in" and "out" positions corresponding to the movement of the clutch handle in the aforementioned patent to the same relative positions.

FIGURE 18 also shows a source of 115 volt alternating current generally designated by the reference character 248. It should be apparent that the footage solenoid 230 is energized each time that the footage microswitch 246 is closed. The pen return solenoid 268 is also energized by the footage microswitch 246 so that the pen 23 is returned to its lefthand reference position each time that the drum 5 is indexed. Any other available electrical source, A.C. or D.C., can be used, it being understood that properly rated components would be substituted for those used with 115 volt A.C.

For purpose of operating the out-of-gear solenoid 231 and the unlatching solenoid 232 in conjunction with the out-of-gear switch 247, it has been necessary to provide a number of conventional circuit components which are employed in combination with these last mentioned solenoids. There is shown a delay relay 249 having a stationary contact 250 and a movable bimetallic contact 251. The delay relay 249 is also provided with a heater 252. The contacts 250 and 251 are normally open; however, when the heater 252 is energized, the contacts 250 and 251 become closed. Another delay relay 253, which is similar in all respects to the delay relay 249, is also provided. This delay relay 253 has a fixed contact 254, a movable bimetallic contact 255 and a heater element 256. Capacitors 257 and 258 are connected across the contact points of the relays 249 and 253, respectively, to prevent arcing when the relays are opened.

A latching relay, generally designated by the reference character 259, is also employed in the circuit of FIGURE 18. The latching relay 259 includes two coils 260 and 261 and two switches 262 and 263, the latter being mechanically jointed, or ganged, together. Whenever the coil 260 is energized the ganged switches 262 and 263 will be moved to the left as shown in FIGURE 18. Whenever the coil 261 is energized the ganged switches 262 and 263 will be moved towards the right. The construction of the latching relay 259 is such that the switches 262 and 263 remain in whatever position they were last moved until the opposite coil has been energized. When the switch 262 is in its left-hand position, it engages contact 264. Whenever the switch 263 is in its right-hand position, it engages the contact 265. Capacitors 266 and 267 are provided for the switches 262 and 263, respectively, so as to prevent arcing when the switches move away from their contacts.

Assuming that the apparatus is operating in an essentially stable manner with the switch 247 in the "in" position, the drilling operation is now interrupted and the switch 247 is thrown to the "out" position. Current passes from the 115 volt source 248, through the switch 247 and the "out" contact, through the switch 262 and contact 264, and to the upper side of the out-of-gear solenoid 231, thereby energizing the same. At this point the armature 234 will be lifted upwardly so as to move the pivotal plate 115 upwardly. This will cause the pen 22 to be deflected to the left so as to produce the horizontal lines 228 on the chart FIGURE 12. Simultaneously, the latching member 239 will be moved to the left so as to engage the notch 235 on the armature 234, preventing the armature from returning to its original position even after the solenoid 231 has been deenergized.

Returning now to FIGURE 18, at the same time that the out-of-gear solenoid 231 is being energized, current will be passing through the heater element 256 of the delay relay 253 and, after a certain period of time, the delay relay will have heated up sufficiently such that the contacts 254 and 255 become closed. When the contacts 254 and 255 are closed, current will pass through the right-hand coil 261 of the latching relay so as to move the switches 262 and 263 to the right. This movement of the switches 262 and 263 to the right will interrupt the circuit to the out-of-gear solenoid and, at the same time, to the delay relay 253.

From the condition described above it will be assumed that the drilling operation is now ready to begin again and the out-of-gear switch 247 is thrown to the "in" position; it should be remembered, however, that the switches 262 and 263 are in their right-hand position. Therefore, current will pass, through the out-of-gear switch 247, through the "in" contacts, through the switch 263 and the contact 265, in parallel to the unlatching solenoid 232 and to the heater element 252 of the delay relay 249. Thus, the unlatching solenoid will be energized such that the latching member 239 will move towards the right, thereby permitting the armature 234 of the out-of-gear solenoid 231 to return to the position shown in FIGURE 16. At the same time, a current will continue to pass through the heater element 252 of the delay relay 249 until, after a short period of time, the contact points 250 and 251 will be closed. Closing of the contacts 250 and 251 will cause current to pass through the left-hand coil 260 of the latching relay 259, thereby returning the switches 262 and 263 to the left-hand position as shown in FIGURE 18. This movement of the switches 262 and 263 will interrupt the supply of current to the unlatching solenoid and to the delay relay 249.

Whereas the present invention has been described with particular relation the drawings attached hereto, it should be understood that other and further modifications apart from those shown or suggested herein may be made within the spirit and scope of this invention. For example, although the chart of FIGURE 12 has been described as a strip of paper which is mounted on a circular drum 5, it should be understood that it is possible to employ a roller type of chart and associated mechanism as is shown in U.S. Patent No. 2,981,102.

What is claimed is:

1. A drilling recorder comprising a frame, a chart mounted within said frame, means mounted within said frame for supporting said chart and for moving said chart over a predetermined path, means for moving said chart supporting means step-wise, a recording element mounted within said frame and being engageable with said chart for marking a record thereon, means for moving said recording element from a given reference position across said chart in a direction transverse to the path movement of said chart, resilient means connected to the means for moving said recording element for urging the latter away from said reference position in said transverse direction, a constant speed driving means mounted within said frame, a clutch means interconnected between said constant speed driving means and the means for moving said recording element for timing the movement of said recording element across said chart at a constant rate of speed, a clutch operating means for engaging and disengaging said clutch means, return means for driving said recording element towards its reference position when said clutch means is disengaged, and a reciprocating means mounted within said frame connected in driving relation with the means for moving said chart supporting means and with the means for engaging and disengaging said clutch means, said return means and said reciprocating means both being movable in response to the completion of a given increment of drilling whereby said chart is advanced step-wise and said recording element is simultaneously returned to its reference position.

2. A recorder as set forth in claim 1 wherein said return means is a pneumatic cylinder.

3. A recorder as set forth in claim 1 wherein said return means is an electrical solenoid.

4. A recorder comprising a frame, a movable chart mounted within said frame, means for moving said chart step-wise over a predetermined path in said frame, a first shaft mounted within said frame and connected in driving relation with the means for moving said chart, a ratchet wheel mounted on said first shaft, an actuating arm pivotally mounted within said frame, a pawl mounted on said actuating arm and engageable with the teeth of said ratchet wheel so as to move said first shaft whenever said actuating arm is pivoted in a given direction, a first recording element mounted adjacent said chart and movable from a given reference position transversally across said chart, a cable connected to said first recording element for moving said recording element away from its reference position across said chart, means resiliently biasing said cable so as to urge said first recording element away from its reference position, a second shaft mounted within said frame, a cylinder freely rotatably mounted on said second shaft, said cable being wound on said cylinder so as to rotate said cylinder in a given direction while said first recording element is moved from its reference position transversally across said drum, means for rotating said second shaft at a constant rate of speed, a clutch plate mounted on said second shaft and being keyed thereto for rotation in common, said clutch plate being axially slidable with respect to said second shaft so as to be movable into and out of engagement with said cylinder, means resiliently urging said clutch plate into engagement with said cylinder, a pin slidably mounted within said second shaft and operatively engaging said clutch plate, a lever mounted within said frame adjacent said second shaft and having a portion bearing against the end of said pin, means on said lever engageable by said actuating arm when the latter pivots in its given direction, whereby, when said actuating arm pivots in said given direction, said lever will be moved so as to cause sliding movement of said pin to disengage said clutch plate from said cylinder, a second recording element mounted adjacent said chart, means for deflecting said second recording element, a pivotal plate mounted within said frame and engageable with said deflecting means for said second recording element whereby, when pivotal plate is moved in a given direction, said second recording element will be deflected in a given direction from a reference line for said second recording element, said pivotal plate being also engageable with said lever whereby, when said pivotal plate is moved in said given direction, said lever will be moved so as to cause sliding movement of said pin and consequent disengagement of said clutch plate from said cylinder, said pivotal plate being provided with a means for engaging the periphery of said cylinder when said pivotal plate is moved in its given direction for preventing rotation of said cylinder when said clutch plate is disengaged from said cylinder, a third recording element mounted adjacent said drum and being movable back and forth over a predetermined path transversally with respect to said chart, an eccentric means driven by a constant speed source for moving said third recording element back and forth across its predetermined path whereby, when said chart is moved continuously, said third recording element will describe a sine wave on said chart, a first reciprocating means mounted within said frame and connected to said first recording element for returning the latter to its reference position, a second reciprocating means mounted within said frame and connecting with said actuating arm, means for actuating said first and second reciprocating means simultaneously in response to a given increment of drilling distance so as to move said actuating arm in said given direction and to return said first recording element to its reference position, a third reciprocating means mounted with said frame and being engageable with said pivotal plate, and means for actuating said third reciprocating means in response to the cessation of drilling operation to move said pivotal plate in its given direction.

5. A recorder as set forth in claim 4 wherein all of said reciprocating means are pneumatic piston-and-cylinder combinations.

6. A recorder as set forth in claim 4 wherein all of said reciprocating means are electrical solenoids.

7. A recorder comprising a frame, a first shaft mounted within said frame, a drum mounted on said first shaft for rotation therewith, a chart mounted on the outer surface of said drum, a worm wheel keyed to one end of said first shaft, a second shaft mounted within said frame, a worm mounted on said second shaft and engaging said worm wheel in driving relation, a bevel gear mounted on said second shaft, a third shaft mounted in said frame substantially at right angles to said second shaft, a bevel gear mounted on said third shaft and engaging the bevel gear of said second shaft in driving relation, a ratchet wheel mounted on said third shaft, an actuating arm pivotally mounted within said frame, a pawl mounted on said actuating arm and engageable with the teeth of said ratchet wheel so as to move said third shaft whenever said actuating arm is pivoted in a given direction, means interconnected between said pawl and said actuating arm for resilient biasing said pawl into engagement with the teeth of said ratchet wheel, a movable annular member surrounding said ratchet wheel and having an opening therein through which said pawl projects to engage the teeth of said ratchet wheel, said annular means being movable so as to vary the position of said opening thereby varying the degree of permissible engagement between said pawl and said ratchet wheel, a first recording element mounted adjacent said drum and movable from a given reference position transversally with respect to said chart, a first cable connected to said first recording element for moving said recording element from its fixed reference position across said chart, means resiliently biasing said first cable so as to urge said first recording element away from its reference position, a second cable connected at one end to said first recording element for returning the latter to its reference position, a fourth shaft mounted within said frame, a cylinder freely rotatably mounted on said fourth shaft, said first cable being wound on said cylinder whereby, when said cylinder is rotated in a given direction, said first recording element will be moved from its reference position transversally across said chart, means for rotating said fourth shaft at a constant rate of speed, a clutch plate mounted on said fourth shaft and being keyed thereto for rotation in common, said clutch plate being axially slidable with respect to said fourth shaft so as to be movable into and out of engagement with said cylinder, means resiliently urging said clutch plate into engagement with said cylinder, a pin slidably mounted within said fourth shaft and operatively engaging said clutch plate, a lever mounted within said frame adjacent said fourth shaft and having a portion bearing against the end of said pin, means on said lever engageable by said actuating arm when the latter pivots in its given direction, whereby, when said actuating arm moves in said given direction, said lever will be moved so as to cause sliding movement of said pin to disengage said clutch plate from said cylinder, a second recording element mounted adjacent said drum, means for deflecting said second recording element, a pivotal plate mounted within said frame and engageable with said deflecting means for said second recording element whereby, when pivotal plate is moved in a given direction, said second recording element will be deflected in a given direction from a fixed reference line for said second recording element, said pivotal plate being also engageable with said lever whereby, when said pivotal plate is moved in its given direction, said lever will be moved so as to cause sliding movement of said pin and consequent disengagement of said clutch plate from said cylinder, said pivotal plate being provided with a means for engaging the periphery of said cylinder when said pivotal plate is moved in its given direction for preventing rotation of said cylinder when said clutch plate is disengaged from said cylinder, a third recording element mounted adjacent said drum and being movable back and forth over a predetermined path transversally with respect to said chart, an eccentric means driven by a constant speed source for moving said third recording element back and forth across its predetermined path whereby, when said drum is moved continuously, said third recording element will describe a sine wave on said chart, a first pneumatic piston-and-cylinder combination mounted within said frame and having a piston rod connecting with the other end of said second cable, a second pneumatic piston-and-cylinder combination mounted within said frame and having a piston rod connecting with said actuating arm, means for supplying pressure to said first and said second piston-and-cylinder combinations simultaneously in response to a given increment of drilling distance so as to move said actuating arm in its given direction and to return said first recording element to its reference position, a third pneumatic piston-and-cylinder combination mounted with said frame and having a piston rod engageable with said pivotal plate, and means for supplying pneumatic pressure to said third piston-and-cylinder combination in response to the cessation of drilling operation for moving said pivotal plate in its given direction.

8. A recorder comprising a frame, a first shaft mounted within said frame, a drum mounted on said first shaft for rotation therewith, a chart mounted on the outer surface of said drum, a worm wheel keyed to one end of said first shaft, a second shaft mounted within said frame, a worm mounted on said second shaft and engaging said worm wheel in driving relation, a bevel gear mounted on said second shaft, a third shaft mounted in said frame substantially at right angles to said second shaft, a bevel gear mounted on said third shaft and engaging the bevel gear of said second shaft in driving relation, a ratchet wheel mounted on said third shaft, an actuating arm pivotally mounted within said frame, a pawl mounted on said actuating arm and engageable with the teeth of said ratchet wheel so as to move said third shaft whenever said actuating arm is pivoted in a given direction, means interconnected between said pawl and said actuating arm for resiliently biasing said pawl into engagement with the teeth of said ratchet wheel, a movable annular member surrounding said ratchet wheel and having an opening therein through which said pawl projects to engage the teeth of said ratchet wheel, said annular means being movable so as to vary the position of said opening thereby varying the degree of permissible engagement between said pawl and said ratchet wheel, a first recording element mounted adjacent said drum and movable from a given reference position transversally with respect to said chart, a first cable connected to said first recording element for moving said recording element from its fixed reference position across said chart, means resiliently biasing said cable so as to urge said first recording element away from its reference position, a second cable connected at one end to said first recording element for returning the latter to its reference position, a fourth shaft mounted within said frame, a cylinder freely rotatably mounted on said fourth shaft, said first cable being wound on said cylinder whereby, when said cylinder is rotated in a given direction, said first recording element will be moved from its reference position transversally across said chart, means for rotating said fourth shaft at a constant rate of speed, a clutch plate mounted on said fourth shaft and being keyed thereto for rotation, said clutch plate being axially slidable with respect to said fourth shaft so as to be movable into and out of engagement with said cylinder, means resiliently urging said clutch plate into engagement with said cylinder, a pin slidably mounted within said fourth shaft and operatively engaging said clutch plate, a lever mounted within said frame adjacent said fourth shaft and having a portion bearing against the end of said pin, means on said lever engageable by said actuating arm when the latter moves in said given direction, whereby, when said actuating arm moves in said given direction, said lever will be moved so as to cause sliding movement of said pin to disengage said clutch plate from said cylinder, a second recording element mounted adjacent said drum, means for deflecting said second recording element, a pivotal plate mounted within said frame and engageable with said deflecting means for said recording element whereby, when pivotal plate is moved in a given direction, said second recording element will be deflected in a given direction from a fixed reference line for said second recording element, said pivotal plate being also engageable with said lever whereby, when said pivotal plate is moved in its given direction, said lever will be moved so as to cause sliding movement of said pin and consequent disengagement of said clutch plate from said cylinder, said pivotal plate being provided with a means for engaging the periphery of said cylinder when said pivotal plate is moved in its given direction for preventing rotation of said cylinder when said clutch plate is disengaged from said cylinder, a third recording element mounted adjacent said drum and being movable back and forth over a predetermined path transversally with respect to said chart, an eccentric means driven by a constant speed source for moving said third recording element back and forth across its predetermined path whereby, when said drum is moved continuously, said third recording element will describe a sine wave on said chart, a first solenoid having its armature connected to the end of said actuating arm whereby when said first solenoid is energized said actuating arm will be moved in said given direction, a second solenoid having its armature connected to the other end of said second cable whereby when said second solenoid is energized said first recording element will be returned to its reference position, means responsive to a predetermined increment of drilling distance for actuating said first and second solenoids, a third solenoid having an armature engageable with said pivotal plate such that, when said third solenoid is energized said pivotal plate will be moved in its given direction, the armature of said third solenoid being provided with a notch, a slidable latching bar mounted adjacent said third solenoid, means resiliently urging said slidable latching bar towards the armature of said third solenoid whereby after said third solenoid is energized said slidable latching bar will be moved into the notch of said armature to lock said armature against return movement even after said third solenoid is deenergized, a fourth solenoid mounted within said frame and having its armature connected to said means for resiliently biasing said latching means whereby, when said fourth solenoid is energized said slidable latching bar will be moved away from the armature of said third solenoid against the action of said resiliently biasing means, thereby permitting the armature of said third solenoid to return to its initial position, means responsive to the interruption of the drilling operation to energize said third solenoid, a first time delay means for deenergizing said third solenoid after a given period of time, means responsive to the resumption of the drilling operation for energizing said fourth solenoid, and a second time delay means for deenergizing said fourth solenoid after a fixed period of time.

References Cited in the file of this patent

UNITED STATES PATENTS 2,981,102    Melton _______________ Apr. 25, 1961